(12) United States Patent
Costea et al.

(10) Patent No.: US 8,161,557 B2
(45) Date of Patent: *Apr. 17, 2012

(54) SYSTEM AND METHOD OF CACHING DECISIONS ON WHEN TO SCAN FOR MALWARE

(75) Inventors: Mihai Costea, Redmond, WA (US); Adrian M. Marinescu, Sammamish, WA (US); Anil Francis Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,622

(22) Filed: Nov. 18, 2010

(65) Prior Publication Data
US 2011/0067109 A1    Mar. 17, 2011

Related U.S. Application Data

(63) Continuation of application No. 11/047,810, filed on Jan. 31, 2005, now Pat. No. 7,882,561.

(51) Int. Cl.
*G06F 11/00* (2006.01)
(52) U.S. Cl. .......................................... 726/24; 713/188
(58) Field of Classification Search ............... 726/22–25; 713/188
See application file for complete search history.

(56) References Cited

U.S. PATENT DOCUMENTS

| | | | |
|---|---|---|---|
| 5,398,196 A | 3/1995 | Chambers | |
| 5,440,723 A | 8/1995 | Arnold et al. | |
| 5,649,095 A | 7/1997 | Cozza | |
| 5,844,986 A | 12/1998 | Davis | |
| 5,948,104 A | 9/1999 | Gluck et al. | |
| 5,956,481 A | 9/1999 | Walsh et al. | |
| 6,230,288 B1 | 5/2001 | Kuo et al. | |
| 6,269,456 B1 | 7/2001 | Hodges et al. | |
| 6,347,375 B1 | 2/2002 | Reinert et al. | |
| 6,735,700 B1 | 5/2004 | Flint et al. | |
| 6,792,543 B2 | 9/2004 | Pak et al. | |
| 6,928,555 B1 | 8/2005 | Drew | |
| 6,976,251 B2 | 12/2005 | Meyerson | |
| 7,058,667 B2 | 6/2006 | Goldick | |
| 7,096,215 B2 | 8/2006 | Bates | |
| 7,096,501 B2 | 8/2006 | Kouznetsov et al. | |
| 7,114,184 B2 | 9/2006 | Malivanchuk et al. | |

(Continued)

OTHER PUBLICATIONS

Office Action from U.S. Appl. No. 11/047,810 mailed Apr. 9, 2010.

(Continued)

*Primary Examiner* — Nirav B. Patel
(74) *Attorney, Agent, or Firm* — Workman Nydegger

(57) ABSTRACT

In accordance with this invention, a system, method, and computer-readable medium that selectively scans files stored on a computing device for malware is provided. One aspect of the present invention includes identifying files that need to be scanned for malware when a software update that includes a malware signature is received. More specifically, attributes of the new malware are identified by searching metadata associated with the malware. Then, the method searches a scan cache and determines whether each file with an entry in the scan cache is the type that may be infected by the malware. If a file is the type that may be infected by the malware, the file is scanned for malware when a scanning event such as an I/O request occurs. Conversely, if the file is not the type that may be infected by the malware, the file may be accessed without a scan being performed.

20 Claims, 4 Drawing Sheets

U.S. PATENT DOCUMENTS

| | | |
|---|---|---|
| 7,188,367 B1 | 3/2007 | Edwards et al. |
| 7,210,041 B1 | 4/2007 | Gryaznov et al. |
| 7,263,561 B1 | 8/2007 | Green et al. |
| 7,290,282 B1 | 10/2007 | Renert et al. |
| 7,415,726 B2 | 8/2008 | Kelly et al. |
| 7,549,055 B2 | 6/2009 | Zimmer |
| 7,752,667 B2 | 7/2010 | Challener |
| 2002/0129277 A1* | 9/2002 | Caccavale ............... 713/201 |
| 2003/0101381 A1 | 5/2003 | Mateev |
| 2003/0110131 A1* | 6/2003 | Alain et al. ............... 705/51 |
| 2003/0145228 A1 | 7/2003 | Suuronen et al. |
| 2004/0158730 A1 | 8/2004 | Sarkar |
| 2005/0038881 A1 | 2/2005 | Ben-Itzhak |
| 2005/0120238 A1 | 6/2005 | Choi |
| 2005/0262576 A1 | 11/2005 | Gassoway |
| 2006/0037079 A1 | 2/2006 | Midgley |
| 2006/0143713 A1* | 6/2006 | Challener et al. ............... 726/24 |
| 2007/0143827 A1 | 6/2007 | Nicodemus |
| 2007/0143851 A1 | 6/2007 | Nicodemus |

OTHER PUBLICATIONS

Office Action from U.S. Appl. No. 11/047,810 mailed Oct. 2, 2009.
Office Action from U.S. Appl. No. 11/047,810 mailed Apr. 15, 2009.
Office Action from U.S. Appl. No. 11/047,810 mailed Oct. 7, 2008.
Notice of Allowance from U.S. Appl. No. 11/047,810 mailed Sep. 30, 2010.

* cited by examiner

| File | First Bit | Second Bit | File Type | Subclass |
|---|---|---|---|---|
| Resume.Doc | 1 | 0 | Doc | |
| Index.Html | 1 | 0 | Html | |
| Archive.Jar | 1 | 0 | Archive | .Exe |
| Picture.Jpeg | 0 | 1 | Jpeg | |
| Editor.Com | 0 | 0 | Archive | Txt, Xls, Exe |

*Figure 3*

SYSTEM AND METHOD OF CACHING DECISIONS ON WHEN TO SCAN FOR MALWARE

CROSS-REFERENCE TO RELATED APPLICATIONS

This application is a continuation of U.S. patent application Ser. No. 11/047,810, entitled "SYSTEM AND METHOD OF CACHING DECISIONS ON WHEN TO SCAN FOR MALWARE", filed Jan. 31, 2005, which is herein incorporated by reference in its entirety.

FIELD OF THE INVENTION

The present invention relates to computing devices and, more particularly, to protecting a computing device from malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is commercially available antivirus software that is available from numerous software vendors. Most antivirus software identifies malware by matching patterns within data to what is referred to as a "signature" of the malware. Typically, antivirus software scans for malware signatures when certain events are scheduled to occur, such as when data is going to be written or read from an input/output ("I/O") device. As known to those skilled in the art and others, computer users have on-going needs to read and write data to I/O devices, such as hard drives, floppy disks, compact disks ("CDs"), etc. For example, a common operation provided by some software applications is to open a file stored on an I/O device and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

As known to those skilled in the art and others, scanning a file for malware is a resource intensive process. As a result, modern antivirus software optimizes the process of scanning for malware. For example, some antivirus software implement a scan cache that tracks the state of files on a computing device with regard to whether the files are infected with malware. Tracking the state of files with a scan cache or equivalent mechanism prevents unnecessary scans from being performed. More specifically, when a file is scanned for malware, a variable is associated with the file in the scan cache that is indicative of whether the file is infected with malware. In instances when a file is not infected, a successive scan of the file is not performed unless the file is modified or the antivirus software is updated. Since user applications will frequently make successive I/O requests directed to the same file, implementing a scan cache may result in significant improvement in the speed in which antivirus software executes.

Numerous software vendors market antivirus software applications and maintain an ever-growing database of malware signatures. In fact, one of the most important assets of antivirus software vendors is the knowledge base of signatures collected from known malware. Typically, when a new malware is identified, software vendors provide a software update to antivirus software that contains a signature for the new malware. When the update is installed on a computing device, the antivirus software is able to identify the new malware. However, the antivirus software is not able to quickly determine if previously scanned files that maintain an entry in a scan cache are infected with the new malware. Thus, when a software update is installed that is able to recognize a new malware, entries in the scan cache are reset. As a result, the performance benefit provided by the scan cache is not available until files on the computing device are re-scanned, which is a resource intensive process. Stated differently, by resetting entries in a scan cache, every file on a computing device will be scanned for malware even in instances when the new malware is not able to infect certain types of files.

SUMMARY OF THE INVENTION

The present invention addresses the above-identified needs by providing a system, method, and computer readable medium of selectively scanning files on a computing device for malware. One aspect of the present invention is a method that identifies the files on a computing device that need to be scanned for malware when a software update that includes a new malware signature is received. More specifically, the method includes identifying attributes of the malware by searching metadata included in the software update. Then, the method searches a scan cache and determines whether each file with an entry in the scan cache is the type that may be infected by the malware. If a file is the type that may be infected by the malware, the file is scanned by antivirus software when a scanning event such as an I/O request occurs. Conversely, if the file is not the type that may be infected by the malware and the file has not been previously identified as being infected, the file may be accessed without a scan being performed.

Another aspect of the present invention is a method that determines whether a software update to antivirus software designed to detect new malware needs to be installed on a computing device. This aspect of the present invention identifies attributes of the computing device from configuration data. In response to receiving a software update designed to detect new malware, the method searches metadata associated with the software update for attributes of the new malware. Then a determination is made regarding whether the new malware is capable of infecting the computing device. In instances when the new malware is capable of infecting the computing device, the method causes the software update to be installed.

In yet another aspect of the present invention, a software system that improves the performance of a computing device by selectively scanning files for malware is provided. In one embodiment of the present invention, the software system includes a scan engine, a scan optimization module, a signature database, and a scan cache. The scan engine compares malware signatures maintained in the signature database with file data stored on the computing device. However, to reduce the amount of data scanned by the scan engine, the scan optimization module identifies the files stored on the computing device that are capable of being infected when a software update that contains a new malware signature is received. Data stored in the scan cache is altered so that the scan engine only scans the files that are capable of being infected by the new malware.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a pictorial depiction of an exemplary scan cache with entries designed to reduce the amount of data scanned for malware in accordance with the present invention;

DETAILED DESCRIPTION

In accordance with this invention, a system, method, and computer-readable medium that selectively scans files stored on a computing device for malware is provided. One aspect of the present invention includes identifying files that need to be scanned for malware when a software update that includes a malware signature is received. More specifically, attributes of the new malware are identified by searching metadata associated with the malware. Then, the method searches a scan cache and determines whether each file with an entry in the scan cache is the type that may be infected by the malware. If a file is the type that may be infected by the malware, the file is scanned for malware when a scanning event such as an I/O request occurs. Conversely, if the file is not the type that may be infected by the malware, the file may be accessed without a scan being performed.

Although the present invention will primarily be described in the context of reducing the amount of data scanned for malware, those skilled in the relevant art and others will appreciate that the present invention is also applicable to other areas than those described. The following description first provides an overview of a system in which the present invention may be implemented. Then methods that implement the present invention are described. The illustrative examples provided herein are not intended to be exhaustive or to limit the invention to the precise forms disclosed. Similarly, any steps described herein may be interchangeable with other steps or combinations of steps in order to achieve the same result.

Figure 1:
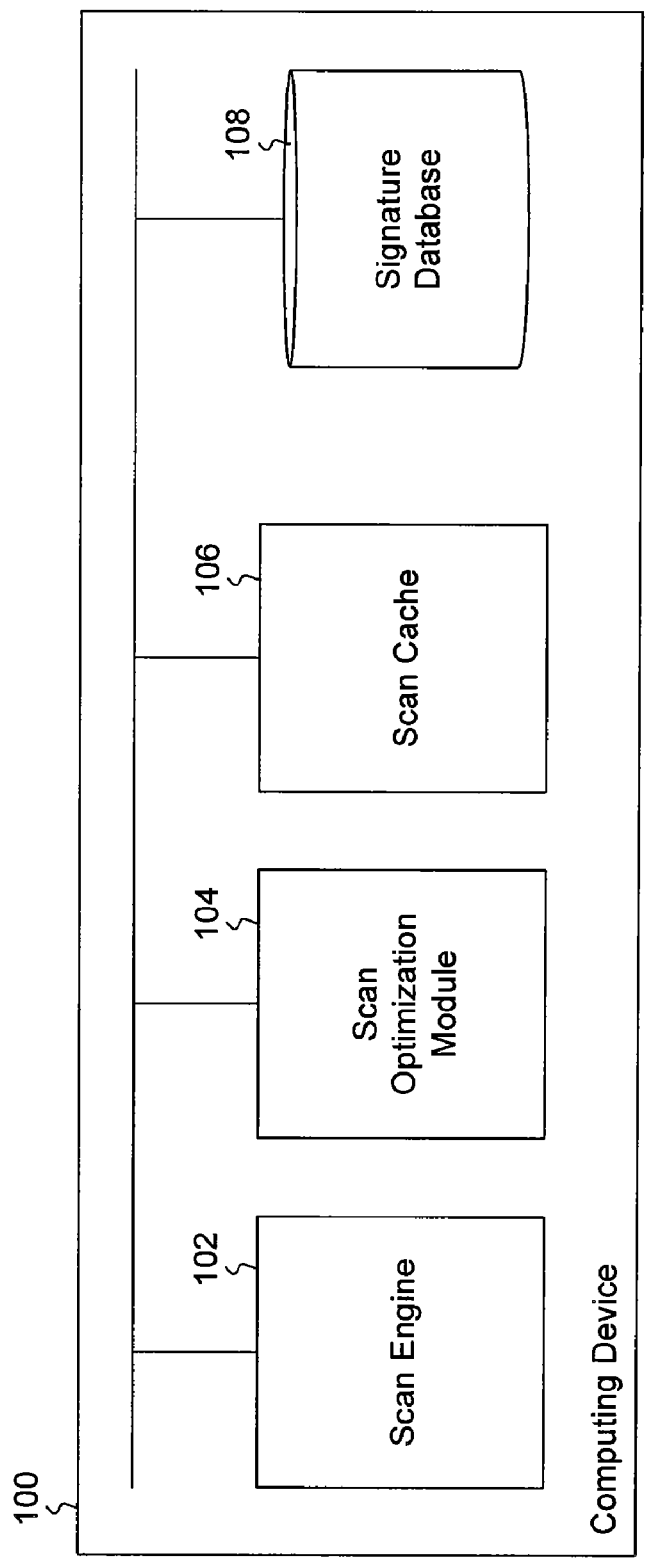
FIG. 1 is a block diagram of the components of a computing device that includes a software module suitable to prevent unnecessary scans for malware in accordance with the present invention.

Referring now to FIG. 1, the following is intended to provide an exemplary overview of one suitable computing device 100 in which the present invention may be implemented. The computing device 100 may be any one of a variety of devices including, but not limited to, personal computing devices, server-based computing devices, personal digital assistants, cellular telephones, other electronic devices having some type of memory, and the like. For ease of illustration and because it is not important for an understanding of the present invention, FIG. 1 does not show the typical components of many computing devices, such as a CPU, keyboard, a mouse, a printer, or other I/O devices, a display, etc. However, as illustrated in FIG. 1, the computing device 100 includes a scan engine 102, a scan optimization module 104, a scan cache 106, and a signature database 108. In general terms describing one embodiment of the present invention, components of the computing device 100 provide a way to efficiently scan files stored on the computing device 100 for malware.

As illustrated in FIG. 1, the computing device 100 includes a scan engine 102 designed to detect malware in a file. Many different software vendors include a scan engine or equivalent mechanism in antivirus software that is designed to identify data characteristic of malware. One known technique employed by some existing antivirus software for identifying malware includes obtaining a copy of the malware "in the wild." Then program code that implements the malware is processed with a hash function that converts the program code into a "signature" which may be used to uniquely identify the malware. Then, in response to an event, such as an I/O request, the antivirus software searches data associated with the request for any known malware signatures. The scan engine 102 illustrated in FIG. 1 may employ this known technique to scan file data for a malware signature. However, the scan engine 102 may be configured to perform additional types of analysis in order to determine if a file is infected with malware. For example, some antivirus software "emulate" program execution to detect behaviors that are characteristic of malware. Also, increasingly, heuristic techniques are being used to detect malware. In any event, it should be well understood that any of these and other malware detection techniques not described herein may be implemented in the scan engine 102.

As illustrated in FIG. 1, the computing device 100 includes a scan optimization module 104 that contains the software routines implemented by the present invention. The scan optimization module 104 improves the performance of the computing device 100 by reducing the number of files that need to be scanned for malware. In one embodiment of the present invention, when a new malware signature is received, the scan optimization module 104 identifies the files stored on the computing device 100 that are capable of being infected by the new malware. More specifically, data stored in the scan cache 106 (described below) that describes attributes of files stored on a computing device 100 are compared to attributes of the new malware. If the new malware is capable of infecting a file, the variables associated with the file in the scan cache 106 may be changed so that the file is scanned for malware before the file is accessible.

The computing device 100 also includes a scan cache 106 that stores information about each file on the computing device 100. Some functions of a scan cache 106 are generally known by those skilled in art. For example, user applications will frequently make successive I/O requests directed to the same file. In this instance, antivirus software may scan the file for malware before the first I/O request is satisfied. In instances when the file is not infected with malware, the successive I/O requests directed to the file do not trigger a scan of the file. Instead, the scan cache 106 tracks whether a file is or is not infected with malware so that unnecessary scans are not performed. More specifically, in one type of scan cache, files are categorized as being (1) known malware, (2) known safe, or (3) unknown with regard to being infected with malware. A file in the "known safe" category is not scanned for malware when an I/O request or other scanning event is directed to the file.

As mentioned previously, when a new malware begins spreading on a communication network, software vendors typically provide an update to antivirus software so that the new malware may be identified. In the prior art, when a new software update is received, files that are identified as being "known safe" in the scan cache 106 are changed to the "unknown" category. Obviously a file in the "unknown" category is scanned for malware when an I/O request or other scanning event is directed to the file. However, the new malware may only be capable of infecting certain types of files. As a result, scanning a file that was previously identified as being free from a malware infection may not always be necessary when a software update designed to detect new malware is received. Thus, the present invention adds file attributes to the scan cache 106 so that unnecessary scans for malware are not performed. More specifically, the file attributes included in the scan cache 106 by aspects of the present invention, allow the scan optimization module 102 to determine whether a file is capable of being infected with a new malware.

As further illustrated in FIG. 1, the computing device 100 includes a signature database 108 that stores malware signatures. For each malware identified by the scan engine 102, the signature database 108 contains a signature of the malware generated using a hash function. When the scan engine 102 scans file data, malware signatures in the signature database 108 are referenced for a match. Thus in instances when a new malware is identified, a signature of the malware is included in the signature database 108.

As illustrated in FIG. 1, each component of the computing device 100, e.g., the scan engine 102, scan optimization module 104, scan cache 106, and signature database 108 are interconnected and able to communicate with other components. As known to those skilled in the art and others, FIG. 1 is a simplified example of one computing device 100 capable of performing the functions of the present invention. Actual embodiments of the computing device 100 will have additional components not illustrated in FIG. 1 or described in the accompanying text. Also, FIG. 1 shows one component architecture for minimizing the amount of data scanned for malware, but other component architectures are possible. Thus, FIG. 1 should be construed as exemplary and not limiting.

Figure 2:
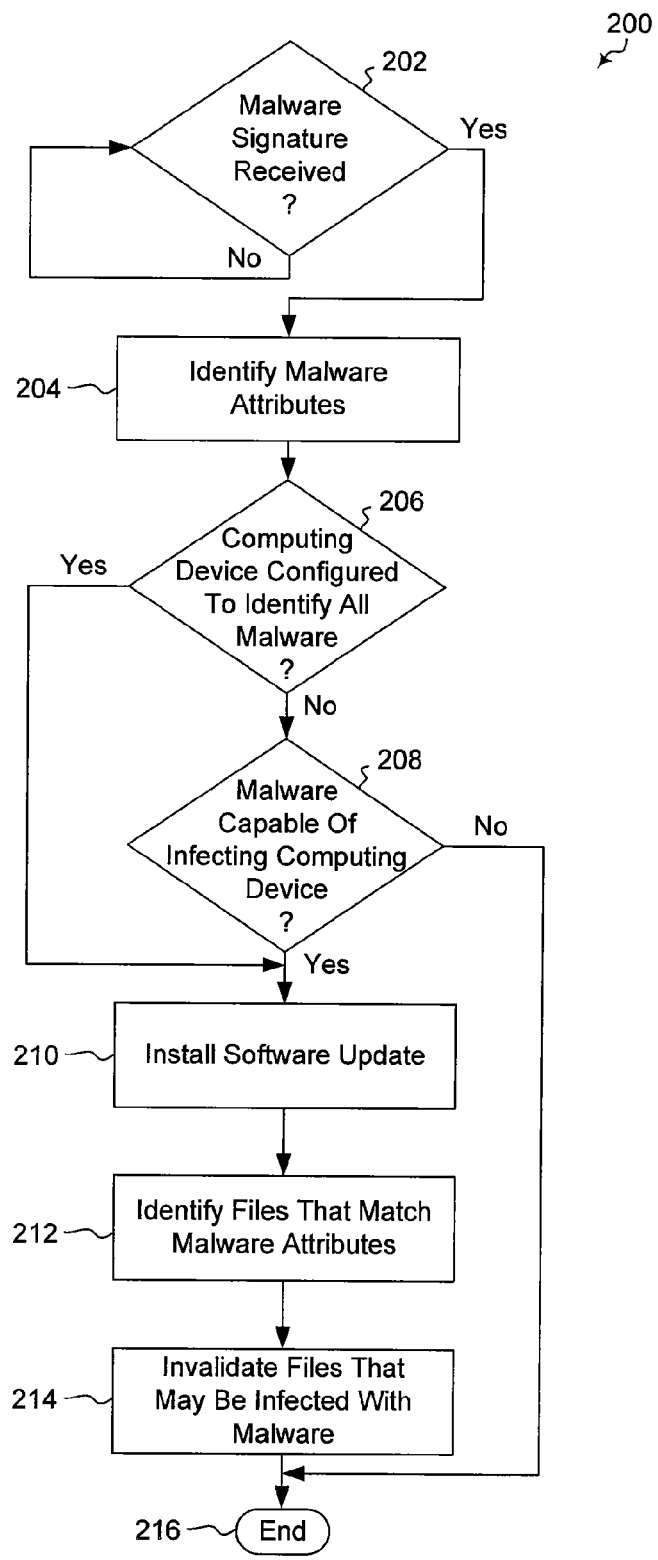
FIG. 2 is a flow diagram illustrating one exemplary embodiment of a method that updates a scan cache to reduce the amount of data scanned for malware in accordance with the present invention.

FIG. 2 is a flow diagram illustrating one exemplary embodiment of an update method 200 formed in accordance with the present invention. In summary, the method 200 reduces the amount of data scanned for malware when a software update that contains a new malware signature is received. To reduce the amount of data scanned, attributes of the malware are identified and information stored on the computing device is updated. If the attributes of the malware indicate that the malware is capable of infecting the computing device, the method 200 searches a database (e.g., scan cache 106) for files and/or data types which may be infected by the malware. The update method 200 may change entries in the scan cache so that files and/or data types that are capable of being infected for the malware are scanned when an I/O or similar event occurs. With continuing reference to FIG. 1 and the accompanying descriptions, an exemplary update method 200 illustrated in FIG. 2 will now be described.

As illustrated in FIG. 2, the update method 200 remains idle, at block 202, until a new malware signature is received at a computing device that implements the present invention. In one embodiment of the method 200, software updates that contain signatures of new malware are automatically obtained from a download center. In this instance, a software update may be obtained at regular intervals (i.e., hourly, daily, weekly, monthly, etc.) or whenever a new software update becomes available. Also, a software update that contains a new malware signature may be obtained manually. For example, a user may determine that a computing device is vulnerable to a malware infection and download a software update that is published on a Web site. However, those skilled in the art and others will recognize that a new malware signature may be received in different instances than those described above. Thus, the examples provided above that describe ways in which a malware signature may be received by a computing device should be construed as exemplary and not limiting.

At block 204, the update method 200 identifies attributes of the malware represented by the malware signature received at block 202. Typically, when a new malware is detected, an anti-virus software developer analyzes malware program code in order to identify attributes of the malware. For example, an anti-virus software developer may find that a new malware (1) is a virus that attaches itself to a word processing document, (2) is spread as an attachment to an email message and (3) and is only able to infect computing devices with a older version of an email application program installed. In accordance with one embodiment of the present invention, metadata is appended to malware signatures by a software developer and included in the software update received at block 202. As described in more detail below, the metadata describes attributes of the malware including but not limited to (1) computer platforms, (2) operating systems, (3) and file/data types that may be infected by the malware. Thus, at block 204, the update method 200 identifies attributes of the malware by searching metadata that is appended to a malware signature.

As illustrated in FIG. 2, at decision block 206, the update method 200 determines if the computing device that implements the present invention is configured to identify all malware. Software formed in accordance with the present invention may obtain data from a user or system administrator regarding whether to scan for all malware or only malware that has the potential to infect the computing device that implements the present invention. Typically, a computing device will be configured to identify all malware regardless of whether the specific device is capable of being infected. By scanning for all malware, the spread of malware to other computing devices that are capable of being infected is prevented. However, in some instances it may be desirable for a computing device to be configured to identify a smaller set of malware that is only capable of infecting a specific type of device. For example, some server-based computing devices act as a distribution point for a one type of content (e.g. Web pages). In this instance, performing a scan for all malware may cause an unacceptable performance degradation in the computing device. Instead, the server-based device may be configured to only identify malware that is capable of infecting the device. As a result, the overhead required to perform scans for malware is significantly reduced. In any event, if the update method 200 determines that a computing device is configured to identify all malware, the method 200 proceeds to block 210, described below. Conversely, if the method 200 determines that a computing device is configured to only identify malware that is capable of causing an infection on the specific device, the method 200 proceeds to block 208.

At decision block 208, the update method 200 determines if the new malware is capable of infecting a computing device that implements the present invention. In order to determine if the computing device may be infected, an analysis of configuration data stored on the computing devices is performed. As known to those skilled in the art and others, modern computing devices maintain databases from which configuration data may be obtained. For example, the system registry is a database used to store settings, options, and preferences regarding the operation of a computing device, including settings for all the hardware and user preferences. The system registry also stores references to the operating system and application programs installed on a computing device. At block 208, the update method 200 analyzes the system registry and other configuration data of the computing device. Then the configuration data is compared to the attributes of the malware identified at block 204 to determine if the computing device is capable of being infected with the malware. As illustrated in FIG. 2, if the malware is capable of infecting the computing device that implements the present invention, the update method 200 proceeds to block 210. Conversely, if the malware is not capable of infecting the computing device, the method 200 proceeds to block 216 where it terminates.

As illustrated in FIG. 2, the software update that contains a new malware signature is installed on a computing device at block 210. Also, the new malware signature and associated metadata are included in the signature database 100 (FIG. 1). Since any one of a number of available software systems may be used to install the software update at block 210, a description of the software system used by the present invention will not be provided here.

At block 212, the update method 200 searches a database, such as the scan cache 106 (FIG. 1), for files that may be infected with the new malware. As mentioned previously, some antivirus systems implement a scan cache that contains information about each file stored on a computing device. In these antivirus systems, the scan cache tracks whether a file is or is not infected with malware so that unnecessary scans for malware are not performed. For example, a file will not be scanned for malware that was previously identified as being free from a malware infection. However, if a new malware is identified, data in the scan cache may be changed to account for the new malware. More specifically, data associated with a file previously identified as being free from a malware infection may be changed so that the file is scanned for malware when a scanning event, such as an I/O request occurs. In accordance with one aspect of the present invention, a "granular" scan cache 106 is provided that enables the update method 200 to identify files on a computing device that have the potential to be infected by a new malware.

For illustrative purposes and by way of example only, a representative scan cache 106 is illustrated in FIG. 3. The scan cache 106 consists of five columns, each of which contains multiple entries. The columns are identified as FILE ID 300, FIRST BIT 302, SECOND BIT 304, FILE FORMAT 306, and SUBCLASS 308. The FILE ID 402 column contains a unique identifier for each file stored on a computing device such as a file name. The FIRST BIT 302, and SECOND BIT 304 columns each store a value that collectively identifies the state of the file. For example, both the FIRST BIT 302 and SECOND BIT 304 columns contain a value that is either a "0" or a "1." In one embodiment of the present invention, if the FIRST BIT 302 column contains a "1" and the SECOND BIT 304 column contains a "0," then the state of the file is "known malware." Alternatively, if the FIRST BIT 302 column contains a "0" and the SECOND BIT 304 column contains a "1," then the state of the file is "known good." Also, if the FIRST BIT 302 column contains a "0" and the SECOND BIT 304 column contains a "0," then the state of the file is "unknown" with regard to being infected with malware.

As further illustrated in FIG. 3, the FILE TYPE 306 column contains data that identifies the format of a file. Those skilled in the art and others will recognize that files associated with a computing device may serve different purposes. For example, a modern computing device may have many different application programs installed that perform a variety of functions. As a result, files typically have a file type that defines the formatting of the file. Also, the scan cache 106 includes a SUBCLASS 308 column that may contain additional information about a file. As illustrated in FIG. 3, the SUBCLASS 306 column may not contain an entry for every file or may contain multiple entries depending on the attributes of a file. For example, modern computing devices allow a set of files to be "archived" into a single file in order to save storage space. In this instance, the SUBCLASS 308 column may contain a file type for each file that is contained in an archived file. However, this is just one example in which the SUBCLASS 308 column may be used to store additional information about a file. As described in more detail below, by including the FILE TYPE 306 column and SUBCLASS 308 column in the scan cache 106, the present invention is able to minimize the number of files scanned for malware. Although FIG. 3 illustrates a scan cache 106 that has specific attributes, those skilled in the art will appreciate that in other embodiments of the present invention, the scan cache 106 may operate with more or fewer than all of the listed attributes.

Returning to the update method 200 illustrated in FIG. 2, the method 200 identifies files (at block 212) that have the potential to be infected with the malware represented by the signature received at block 202. More specifically, entries off files in the scan cache 106 are compared to the attributes of the new malware identified at block 204. Through this comparison, the method 200 identifies files that have the potential to be infected with the new malware. For example, at block 204, the method 200 may determine that the new malware is only capable of infecting files that are Microsoft Word™ documents (e.g. files with the "DOC" file type). In this instance, the update method 200 will determine that all files with entries in the scan cache 106 with the matching file type have the potential to be infected with the malware. In the context of the scan cache 106 illustrated in FIG. 3, the file RESUME. DOC 310 is the only file that has the potential to be infected with the malware.

As illustrated in FIG. 2, at block 214 the update method 200 change entries in the scan cache 106 that represent files that have the potential to be infected with the new malware. More specifically, files represented in the scan cache 106 that were categorized as being in the "known good" state which also have the potential to be infected with the new malware are moved to the "unknown" state. As described in more detail below with reference to FIG. 4, entries in the scan cache 106 that represent files in the "unknown" state are scanned for malware when an I/O request or other similar event occurs. Significantly, the state of a file as represented in the scan cache that is not capable of being infected with the new malware does not change. Thus, an entry in the scan cache that represents a file in the "known good" state that is not capable of being infected with the new malware will not be repetitively scanned for malware. Then the update method 200 proceeds to block 216 where it terminates.

Implementations of the present invention are not limited to the update method 200 shown in FIG. 2 or the examples provided in the accompanying text. For example, the update method 200 was described primarily in the context of instances when new malware is identified. However, those skilled in the art and others will recognize that the update method 200 may minimize the amount of data scanned for malware when the scan engine 102 (FIG. 1) is first installed on a computing device. Thus, the embodiment of the present invention described above with reference to FIG. 2 should be construed as exemplary and not limiting.

Figure 4:
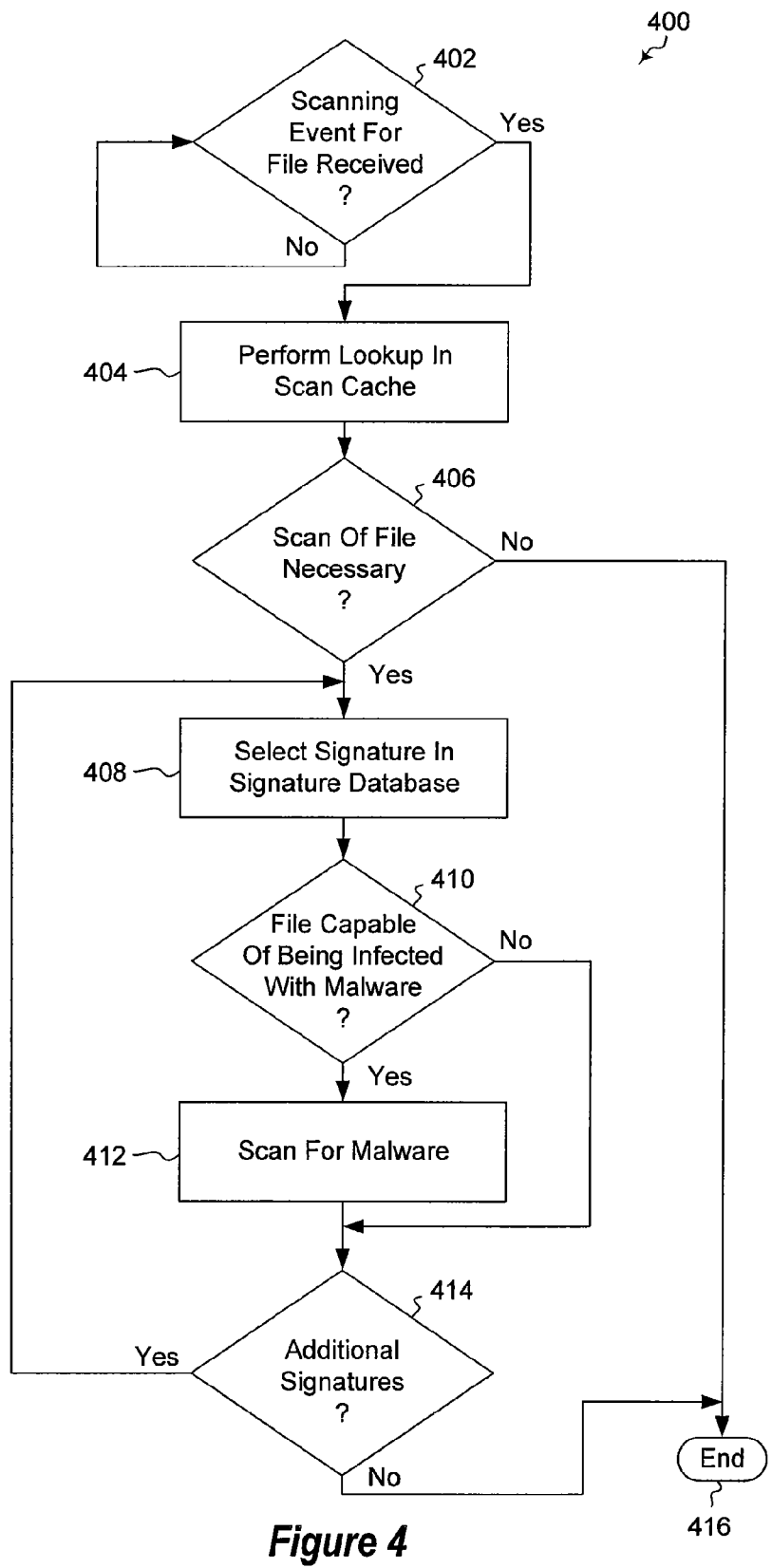
FIG. 4 is a flow diagram illustrating one exemplary embodiment of a method that determines whether to perform a scan for malware when a scanning event occurs in accordance with the present invention.

Now with reference FIG. 4, a scan method 400 that efficiently scans a file on a computing device for malware will be described. Those skilled in the art and others will recognize that the scan method 400 is designed to work in conjunction with the update method 200 and scan cache 106 described above with reference to FIGS. 2 and 3. With continuing reference to FIG. 1-3 and the accompanying descriptions, an exemplary scan method 400 illustrated in FIG. 4 will now be described.

At decision block 402, the scan method 400 remains idle and waits for an event that typically requires a file to be scanned for malware. As will be appreciated by those skilled in the art and others, antivirus software may initiate a file scan in many different instances. For example, a computer user may issue a command to start execution of a program by "double clicking" on an icon associated with the program. To prevent malware from being executed, antivirus software may cause one or more files associated with the program to be scanned before the program is loaded into memory and executed. However, as known to those skilled in the art and others, the example provided above should be construed as exemplary and not limiting, as a file may be scanned for malware in other instances.

At block 404, the scan method 400 queries a database, such as the scan cache 106 (FIG. 3), and identifies the state of the file that is the object of the event received at block 402. As described above with reference to FIG. 3, variables are associated with files in the scan cache 106 which represent one of three possible states, including (1) known malware, (2) known good, or (3) unknown. At block 404, the method 400 performs a query of the scan cache 106 and identifies the state of the file that is the object of the event received at block 402. Since generating a query to a database may be performed using techniques generally known in the art, further description of the techniques used at block 404 will not be described further here.

At decision block 406, the method 400 determines if a scan of the file that is the object of the event received at block 402 is necessary. As mentioned previously, in one embodiment of the present invention, a file is only scanned for malware when the state of the file is unknown with regard to being infected with malware. In this instance, the scan method 400 proceeds to block 408 described below. Conversely, if the file is in a different state and a scan of the file for malware is not necessary, the method 400 proceeds to block 416 where it terminates.

At block 408, the scan method 400 selects a malware signature that is stored in a database. More specifically, in one embodiment of the present invention, the scan method 400 selects a signature stored in the signature database 108 described above with reference to FIG. 1. As described previously, the database 108 stores signatures of malware identified as being capable of infecting a computing device. When a new malware is identified, the signature of the malware is in included in the signature database 108. Then the scan engine 102 sequentially selects signatures in the signature database 108 when scanning a file for malware. However, since selecting a signature in a database with a query or equivalent mechanism is generally known in the art, further description of these techniques will not be described in further detail here.

At decision block 410, the scan method 400 determines whether the malware represented by the signature selected at block 408 is capable of infecting the file that is the object of the event received at block 402. In order to determine if the file is capable of being infected, attributes of a file are compared to metadata associated with the malware. As described previously, one aspect of the present invention associates metadata with a malware signature. The metadata may include, but is not limited to computer platforms, operating systems, and file/data types that have the potential to be infected by the malware. At block 410, the method 400 compares attributes of the file that is the object of the request received at block 402, with metadata that describes attributes of the malware. By making the comparison, the method 400 is able to determine if the file is capable of being infected with the malware. In instances when the file is capable of being infected by the malware represented by the selected malware signature, the method 400 proceeds to block 412 described below. Conversely, if the file is not capable of being infected by the malware, the method 400 proceeds to block 416 where it terminates.

At block 412, the scan method 400 causes a scan to be performed of the file that is the object of the request received at block 402. As mentioned previously, software-implemented routines in the scan engine 106 (FIG. 1) are configured to scan a file for malware. In one embodiment of the present invention, the scan performed at block 412 includes matching patterns of data to a malware "signature." However, the scan may include additional malware identification methods. For example, the scan performed at block 412 may include identifying heuristic factors that are characteristic of malware or emulating program behavior in a virtual operating environment. In any event, it should be well understood that the techniques for identifying malware described above should be construed as exemplary and not limiting. The scan method 400 may be implemented with any a number of malware scanning techniques not described herein.

At decision block 414, the scan method 400 determines if any malware signatures contained in the signature database 108 have not previously been selected. Typically, when scanning a file for malware, all of the malware signatures stored in a database are compared to data in a file. The scan method 400 sequentially selects all of the malware signatures stored in the database 108 and determines if the malware represented by the signature is capable of infecting a file. In any event, if additional malware signatures do not need to be selected, the scan method 400 proceeds to block 416 where it terminates. Conversely, if additional malware signatures will be selected, the method 400 proceeds back to block 408 and blocks 408 through 414 repeat until all of the malware signatures in the signature database 108 have been selected.

While the preferred embodiment of the invention has been illustrated and described, it will be appreciated that various changes can be made therein without departing from the spirit and scope of the invention.

What is claimed:

1. In a computing device including a processor a method of selectively scanning files for malware in response to a software update, the method comprising:
   a computing device receiving a software update that contains a malware signature and malware metadata for a malware, the malware metadata defining one or more file types, from among the plurality of different file types, that the malware is capable of infecting, the computing device also including a scan cache of a plurality of scan entries, each scan entry corresponding to a file and including at least a first attribute indicating a file type for the file and at least a second attribute indicating an infection status for the file, the infection status selected from among known safe, known malware, and unknown, each file type selected from among a plurality of different file types;
   for each scan entry in the plurality of scan entries, the computing device comparing the indicated file type for each corresponding file in the scan entry to the one or more files types defined in the malware metadata;
   the computing device identifying a plurality of potentially infectable files from the scan cache that have the potential to be infected by the malware by comparing the file type for each of the plurality of potentially infectable files with the one or more file types defined in the malware metadata;
   the computing device identifying one or more files from the scan cache that are not capable of being infected by the malware by determining that the file type for each of the one or more files is not included in the one or more file types defined in the malware metadata;
   modifying scan entries in the scan cache that correspond to the plurality of potentially infectable files that were previously identified with a known safe infection status by changing the known safe infection status in the second attribute to an infection status of unknown, such that each one of the scan entries in the scan cache that (1) identifies a file of a type matching the one or more file types identified in the malware metadata and (2) that was previously identified as having a known safe infection status in the second attribute will be modified to have an infection status in the second attribute of unknown;
   the computing device performing a scan for malware for any of the plurality of potentially infectable files having the second attribute set as unknown in response to receiving an I/O request for the any of the corresponding one or more of the plurality of potentially infectable files; and
   the computing device retaining scan entries in the scan cache for each of the one or more files identified as not capable of being infected by the malware, without modifying the second attribute; and
   the computing device refraining from scanning the one or more files that are identified as not capable of being infected by the malware in response to any I/O request for said any of the one or more files identified as not capable of being infected by the malware.

2. The method as recited in claim 1, further comprising for at least one of the potentially infectable files:
   receiving an I/O request for the file;
   in response to receiving the I/O request for the file, referring to the second attribute in the scan entry for the file to determine that the indicated infection status for the file is unknown;
   scanning the file to determine if the file is infected with the malware in response to the infection status of the file being unknown; and
   updating the second attribute in the scan entry for the file to indicate an infection status for the file based on the results of scanning the file.

3. The method as recited in claim 1, further comprising for at least one file that is not capable of being infected by the malware:
   receiving an I/O request for the file;
   in response to receiving the I/O request for the file, referring to the second attribute in the scan entry for the file to determine the infection status for the file; and
   preventing scanning the file for malware in response to the infection status of the file.

4. The method as recited in claim 1, wherein the malware metadata further identifies one or more of computer platforms and operating systems that the malware is capable of infecting.

5. The method as recited in claim 4, further comprising determining if the malware is capable of infecting the operating system of the computing device based on the malware metadata.

6. The method as recited in claim 5, wherein the operating system the computing device is identified by searching a configuration database stored on the computing device.

7. The method as recited in claim 5, wherein determining if the malware is capable of infecting the operating system of the computing device based on the malware metadata comprises determining that the malware is capable of infecting the operating system of the computing device based on the malware metadata; and further comprising:
   in response to determining that the malware is capable of infecting the operating system of the computing device, installing the software update on the computing device.

8. The method as recited in claim 1, wherein modifying scan entries in the scan cache for one or more of the plurality of potentially infectable files comprises invalidating the scan entries for the one or more of the plurality of potentially infectable files.

9. A computer program product comprising one or more computer storage devices having stored thereon computer-executable instructions, that when executed at a processor, cause the computing device to perform the following:
   the computing device receiving a software update that contains a malware signature and malware metadata for a malware, the malware metadata defining one or more file types, from among the plurality of different file types, that the malware is capable of infecting, the computing device also including a scan cache of a plurality of scan entries, each scan entry corresponding to a file and including at least a first attribute indicating a file type for the file and at least a second attribute indicating an infection status for the file, the infection status selected from among known safe, known malware, and unknown, each file type selected from among a plurality of different file types;
   for each scan entry in the plurality of scan entries, the computing device comparing the indicated file type for each corresponding file in the scan entry to the one or more files types defined in the malware metadata;

the computing device identifying a plurality of potentially infectable files from the scan cache that have the potential to be infected by the malware by comparing the file type for each of the plurality of potentially infectable files with the one or more file types defined in the malware metadata;

the computing device identifying one or more files from the scan cache that are not capable of being infected by the malware by determining that the file type for each of the one or more files is not included in the one or more file types defined in the malware metadata;

the computing device modifying scan entries in the scan cache that correspond to the plurality of potentially infectable files that were previously identified with a known safe infection status by changing the known safe infection status in the second attribute to an infection status of unknown, such that each one of the scan entries in the scan cache that (1) identifies a file of a type matching the one or more file types identified in the malware metadata and (2) that was previously identified as having a known safe infection status in the second attribute will be modified to have an infection status in the second attribute of unknown;

the computing device performing a scan for malware for any of the plurality of potentially infectable files having the second attribute set as unknown in response to receiving an I/O request for the any of the corresponding one or more of the plurality of potentially infectable files; and the computing device retaining scan entries in the scan cache for each of the one or more files identified as not capable of being infected by the malware, without modifying the second attribute; and the computing device refraining from scanning the one or more files that are identified as not capable of being infected by the malware in response to any I/O request for said any of the one or more files identified as not capable of being infected by the malware.

10. The computer program product as recited in claim 9, further comprising for at least one of the potentially infectable files, computer-executable instructions, that when executed, cause the computing device to perform the following:
receiving an I/O request for the file;
in response to receiving the I/O request for the file, referring to the second attribute in the scan entry for the file to determine that the indicated infection status for the file is unknown;
scanning the file to determine if the file is infected with the malware in response to the infection status of the file being unknown; and
updating the second attribute in the scan entry for the file to indicate an infection status for the file based on the results of scanning the file.

11. The computer program product as recited in claim 9, further comprising for at least one file that is not capable of being infected by the malware, computer-executable instructions, that when executed, cause the computing device to perform the following:
receiving an I/O request for the file;
in response to receiving the I/O request for the file, referring to the second attribute in the scan entry for the file to determine the infection status for the file; and
preventing scanning the file for malware in response to the infection status of the file.

12. The computer program product as recited in claim 9, wherein the malware metadata further identifies one or more of computer platforms and operating systems that the malware is capable of infecting.

13. The computer program product as recited in claim 12, further comprising computer-executable instructions, that when executed, cause the computing device to determine if the malware is capable of infecting the operating system of the computing device based on the malware metadata.

14. The computer program product as recited in claim 13, further comprising computer-executable instructions, that when executed, cause the computing device to identify the operating system of the computing device by searching a configuration database stored on the computing device.

15. The computer program product as recited in claim 13, wherein computer-executable instructions, that when executed, cause the computing device to determine if the malware is capable of infecting the operating system of the computing device based on the malware metadata comprise computer-executable instructions, that when executed, cause the computing device to determine that the malware is capable of infecting the operating system of the computing device based on the malware metadata; and further comprising:
computer-executable instructions, that when executed, cause the computing device to install the software update on the computing device in response to determining that the malware is capable of infecting the operating system of the computing device.

16. The computer program product as recited in claim 9, wherein computer-executable instructions, that when executed, cause the computing device to modify scan entries in the scan cache for one or more of the plurality of potentially infectable files comprise computer-executable instructions, that when executed, cause the computing device to invalidate the scan entries for the one or more of the plurality of potentially infectable files.

17. A computer system, the computer system comprising:
a processor; and
one or more storage devices, the one or more storage devices having stored thereon:
a scan cache of a plurality of scan entries, each scan entry corresponding to a file and including at least a first attribute indicating a file type for the file and at least a second attribute indicating an infection status for the file, the infection status selected from among known safe, known malware, and unknown, each file type selected from among a plurality of different file types; and
computer-executable instructions representing a scan optimization module, the scan optimization module facilitating selective scanning of the plurality of files for malware by being configured for:
receiving a software update that contains a malware signature and malware metadata for a malware, the malware metadata defining one or more file types, from among the plurality of different file types, that the malware is capable of infecting, the computing device also including a scan cache of a plurality of scan entries, each scan entry corresponding to a file and including at least a first attribute indicating a file type for the file and at least a second attribute indicating an infection status for the file, the infection status selected from among known safe, known malware, and unknown, each file type selected from among a plurality of different file types;

for each scan entry in the plurality of scan entries, comparing the indicated file type for each corresponding file in the scan entry to the one or more files types defined in the malware metadata;

identifying a plurality of potentially infectable files from the scan cache that have the potential to be infected by the malware by comparing the file type for each of the plurality of potentially infectable files with the one or more file types defined in the malware metadata;

identifying one or more files from the scan cache that are not capable of being infected by the malware by determining that the file type for each of the one or more files is not included in the one or more file types defined in the malware metadata;

modifying scan entries in the scan cache that correspond to the plurality of potentially infectable files that were previously identified with a known safe infection status by changing the known safe infection status in the second attribute to an infection status of unknown, such that each one of the scan entries in the scan cache that (1) identifies a file of a type matching the one or more file types identified in the malware metadata and (2) that was previously identified as having a known safe infection status in the second attribute will be modified to have an infection status in the second attribute of unknown;

performing a scan for malware for any of the plurality of potentially infectable files having the second attribute set as unknown in response to receiving an I/O request for the any of the corresponding one or more of the plurality of potentially infectable files; and retaining scan entries in the scan cache for each of the one or more files identified as not capable of being infected by the malware, without modifying the second attribute; and refraining from scanning the one or more files that are identified as not capable of being infected by the malware in response to any I/O request for said any of the one or more files identified as not capable of being infected by the malware.

18. The computer system of claim 17, wherein the one or more storage devices have further stored thereon computer-executable instructions representing a scan engine, the scan engine configured to scan files for malware and wherein the scan optimization module is further configured to:

receive an I/O request for a file;

in response to receiving the I/O request for the file, referring to the second attribute in the scan entry for the file to determine that the indicated infection status for the file is unknown;

invoke the scan engine to scan the file to determine if the file is infected with the malware in response to the infection status of the file being unknown; and updating the second attribute in the scan entry for the file to indicate an infection status for the file based on the results of scanning the file.

19. The computer system of claim 17, wherein the scan optimization module is further configured to:

receiving an I/O request for the file;

in response to receiving the I/O request for the file, referring to the second attribute in the scan entry for the file to determine the infection status for the file; and preventing scanning the file for malware in response to the infection status of the file.

20. The computer system of claim 17, wherein the malware metadata further identifies one or more of computer platforms and operating systems that the malware is capable of infecting.

* * * * *